(12) United States Patent
Nakamura et al.

(10) Patent No.: US 6,618,203 B2
(45) Date of Patent: Sep. 9, 2003

(54) DEVICE FOR SUPPORTING COMBINER FOR USE IN VEHICLE DISPLAY SYSTEM

(75) Inventors: Go Nakamura, Shizuoka (JP);
Kunimitsu Aoki, Shizuoka (JP);
Tetsuya Sugiyama, Shizuoka (JP);
Kousuke Kinoshita, Shizuoka (JP);
Takanori Watanabe, Shizuoka (JP);
Yoshihide Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/103,812

(22) Filed: Mar. 25, 2002

(65) Prior Publication Data

US 2002/0141077 A1 Oct. 3, 2002

(30) Foreign Application Priority Data

Mar. 30, 2001 (JP) ........................ 2001-099568

(51) Int. Cl.⁷ ................. G02B 27/12; G02B 5/32; G02B 7/02; G09G 5/00
(52) U.S. Cl. ............... 359/632; 359/630; 359/13; 359/15; 359/817; 345/7; 345/8
(58) Field of Search ............... 359/817, 13, 15, 359/630, 631, 632, 633, 629; 345/7, 8, 9

(56) References Cited

U.S. PATENT DOCUMENTS

| | | | | |
|---|---|---|---|---|
| 4,664,475 A | * | 5/1987 | Ferrer | 359/15 |
| 5,381,267 A | * | 1/1995 | Woody | 359/632 |
| 5,517,337 A | * | 5/1996 | Dupin et al. | 359/13 |
| 6,072,444 A | * | 6/2000 | Burns | 345/7 |
| 6,078,428 A | * | 6/2000 | Rambert et al. | 359/632 |
| 6,301,053 B1 | * | 10/2001 | Cheesman | 359/632 |

FOREIGN PATENT DOCUMENTS

| | | | |
|---|---|---|---|
| DE | 43 23 571 | | 1/1994 |
| GB | 2540020 | * | 8/1985 |
| JP | 5-77657 | | 3/1993 |

OTHER PUBLICATIONS

Copy of German Patent Office Communication for corresponding German Patent Application 102 14 184.3 dated Nov. 28, 2002 with partial translation.

* cited by examiner

Primary Examiner—Loha Ben
(74) Attorney, Agent, or Firm—Armstrong, Westerman & Hattori, LLP

(57) ABSTRACT

In the developed state of the combiner 13, the first arm 19 extends along a vertical line passing the center of gravity G of the combiner 13, and the second arm 21 and the third arm 23 are aligned on and extended along a line which couples the rear end of the base member 17 and the other end 19b of the first arm 19 and tilts from the vertical direction toward the horizontal direction so that the combiner 13 is arranged in front of the eye point I at a tilting angle of reflecting the image light of the displayed image emitted from the display device of the projector unit 9 toward the eye point I of the driver 3. In such a configuration, the virtual image of the displayed image on the combiner which is to be visually recognized from the eye point can be visually recognized stable with no shaking in a vehicle which is susceptible to the vibration from the road face.

4 Claims, 3 Drawing Sheets

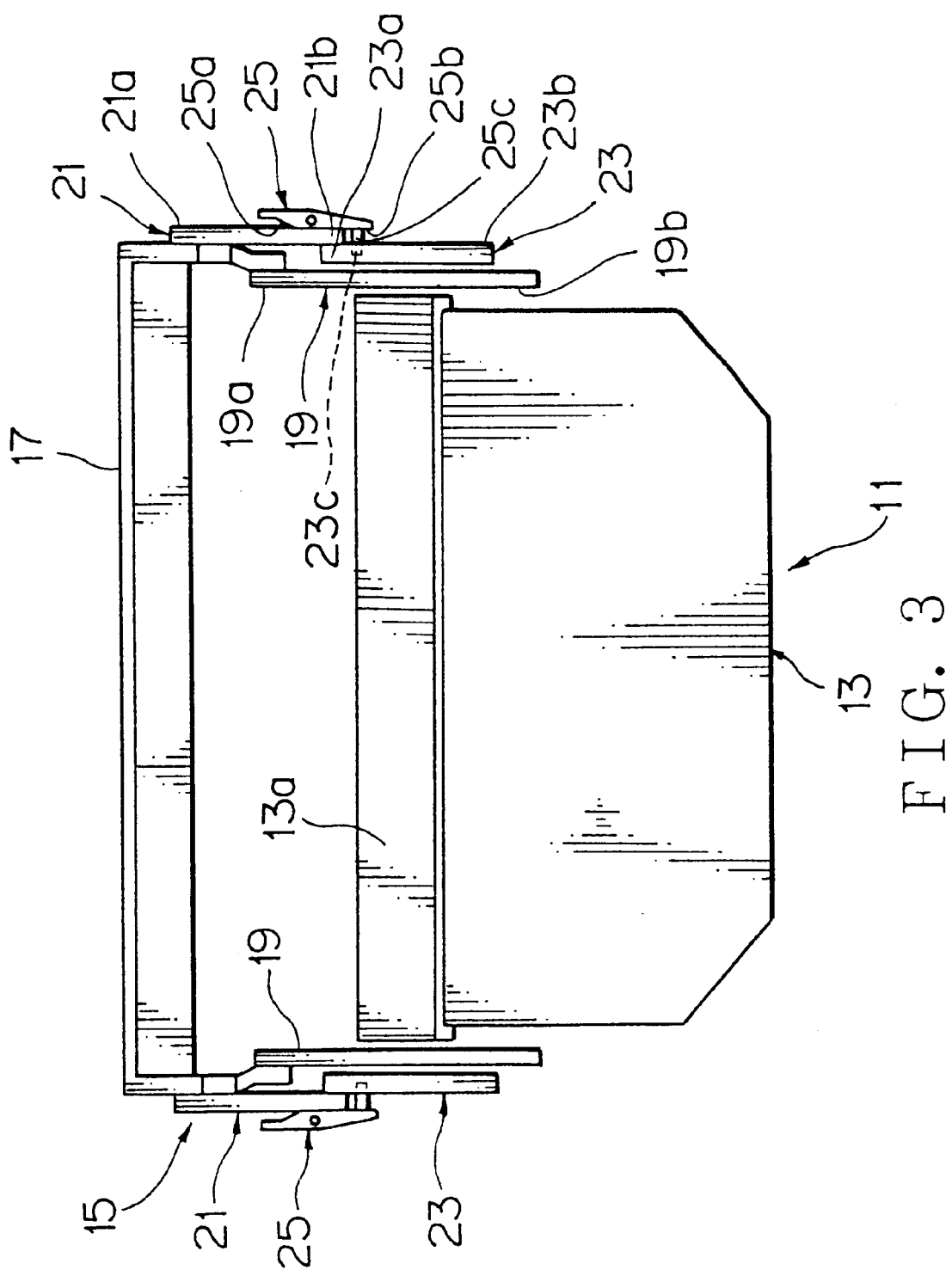

DEVICE FOR SUPPORTING COMBINER FOR USE IN VEHICLE DISPLAY SYSTEM

BACKGROUND OF THE INVENTION

1. Field of the Invention

This invention relates to a device for supporting a ceiling-suspended combiner which is arranged in front of an eye point of a driver within a vehicle room and in which image light of a displayed image is projected so that it is visually recognized as an virtual image from the eye point.

2. Description of the Related Art

In a "head-up display" in which the displayed image of information on vehicle driving is visually recognized as a virtual image from an eye point, the image light of the displayed image is projected onto a front glass in front of the eye point or a combiner of a transparent material arranged in front of the eye point.

Where the image light of the displayed image is to be projected onto the combiner, in order that the combiner is located in a field of view in front of the eye point, as disclosed in JP-A-5-77657, the combiner is suspended from an interior ceiling in front of the eye point.

In this case, in a vehicle, generally, in order that the driver's head does not bump against the ceiling, a suitable interval is assured therebetween. Therefore, the eye point which is at a position lower than the head is necessarily separated from the ceiling by a larger interval.

Therefore, in order to arrange the combiner suspended from the ceiling in front of the eye point, a member for suspending the combiner must have a certain length. Therefore, the vibration of the combiner or member for suspending is not negligible in order to recognize the virtual image of the displayed image visually with no movement from the eye point

SUMMARY OF THE INVENTION

An object of this invention is to provide a device for supporting a combiner for use in a vehicle display system, which permits a displayed virtual image of vehicle driving information to be visually recognized with no shaking or movement in a vehicle which is susceptible to the vibration from the road.

In order to attain the above object, in accordance with this invention, there is provided a supporting device for supporting a combiner for a vehicle display system which is suspended from a ceiling of a vehicle room and located in front of an eye point in the vehicle room and on which image light of a displayed image for driving information is projected so that a virtual image of the displayed image is visually recognized from the eye point, comprising:

a first arm with the one end pivoted on the ceiling and the other end attached to the combiner, the first arm being swingable around a pivoting point at the one end;

a second arm with the one end pivoted on the ceiling which is apart from the one end of the first arm in a horizontal direction of the vehicle; and a third arm with the one end pivoted on the other end of the second arm and the other end pivoted on the other end of the first arm, wherein in a developed state of the combiner where the first arm extends along a vertical line passing the center of gravity of the combiner and the combiner is arranged in front of the eye point, the second arm and the third arm are aligned on and extended along a line which couples a pivoting point at the one end of the second arm on the ceiling and an attaching point at the other end of the first arm to the combiner; and in a folded state of the combiner where the first arm extends substantially along the ceiling and the combiner is retracted from the front of the eye point toward the ceiling, the second arm is folded relatively to the third arm from a pivoting point of the other end of the second arm on the one end of the third arm so that the second arm and the third arm are extended substantially along the ceiling.

In this configuration, the vertical shaking of the combiner is stopped by the first arm and ceiling, and the horizontal shaking thereof is stopped by the second arm, third arm and the ceiling. Thus, in the vehicle which is susceptible to the vibration from the road face, using the combiner, the displayed image of the additional information necessary for vehicle driving can be visually recognized stably with no shaking.

In a preferred embodiment of the above supporting device, the second arm and third arm are adapted so that the distance between the pivoting point where the one end of the second arm is pivoted on the ceiling and the pivoting point where the other end of the second arm is pivoted on the one end of the third arm is equal to that between the pivoting point where the one end of the third arm is pivoted on the other end of the second arm and the pivoting point where the other end of the third arm is pivoted on the other end of the first arm.

In this configuration, in order to cause the second arm and the third arm to overlap substantially completely in the folded state of the combiner, the horizontal distance to be set between the one end of the first arm and the one end of the second arm can be uniquely defined with the dimension approximately equal to the distance between both pivoting points at the one end and the other end of the first arm. This facilitates to design the supporting device easily.

In a preferred embodiment of the supporting device, it further includes a stopper means for stopping a folding movement of the other end of the second arm relative to the one end of the third arm, which is locked to at least one of the second arm and the third arm in the developed state of the combiner, the stopper means being releasable from a locked state by application of prescribed external force.

In this configuration, the horizontal movement of the combiner can be more surely stopped by the second arm, third arm and ceiling.

The above and other objects and features of the invention will be more apparent from the following description taken in conjunction with the accompanying drawings.

BRIEF DESCRIPTION OF THE DRAWINGS

FIG. 3 is an enlarged front view of a device for supporting a combiner for the vehicle display system as shown in FIG. 1.

DESCRIPTION OF THE PREFERRED EMBODIMENTS

Figure 1:
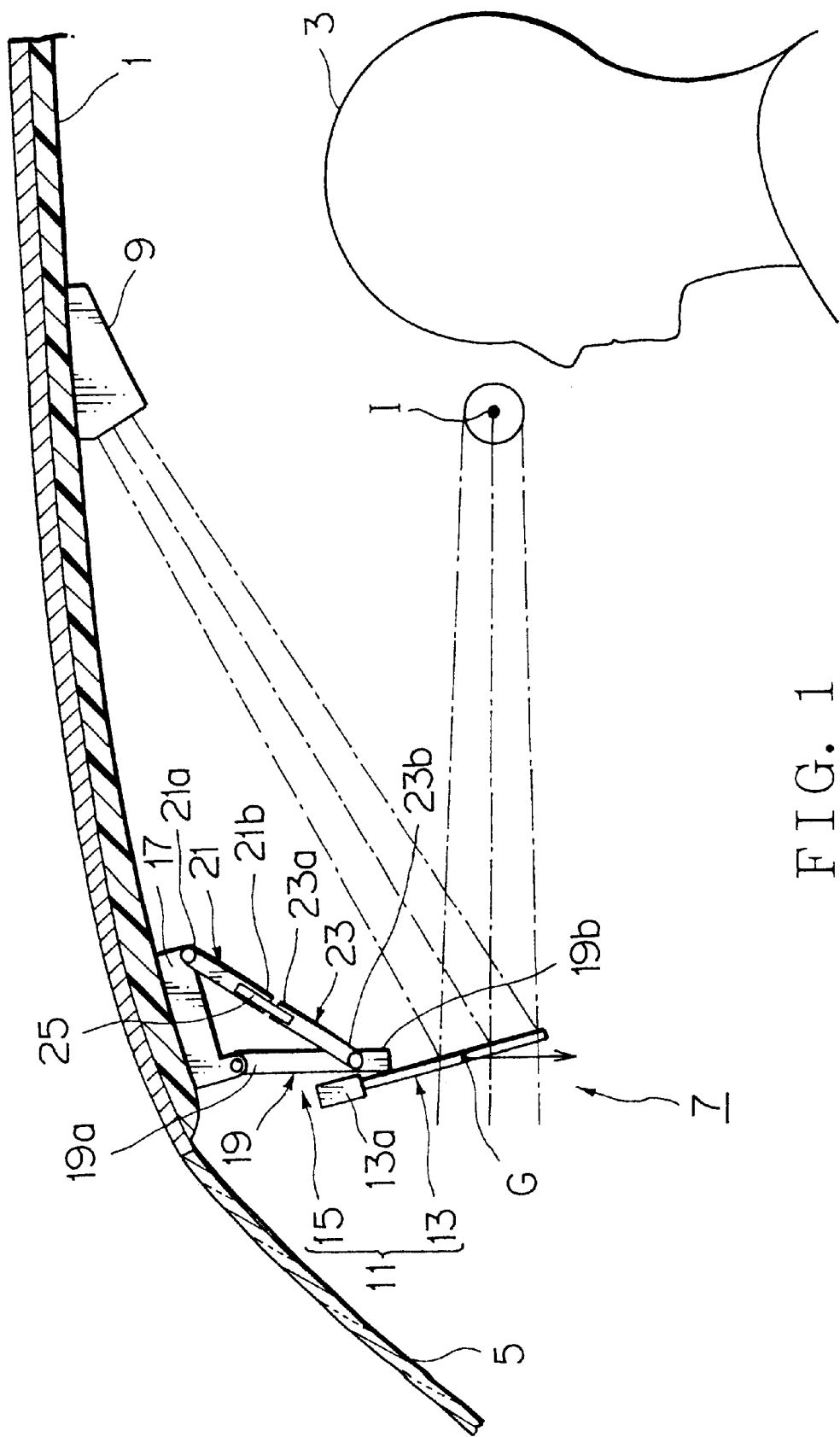
FIG. 1 is a side view of an embodiment of a vehicle display system to which a device for supporting a combiner is applied in a state where the combiner has been developed.

Now referring to the drawings, an explanation will be given of a device for supporting a combiner for use in a vehicle display system.

FIG. 1 is a side view of an embodiment of a vehicle display system to which a device for supporting a combiner is applied. In FIG. 1, the vehicle display system according this embodiment generally denoted by reference numeral 7 includes a projector unit 9 and a combiner unit 11. The projector unit 9 is arranged on a ceiling 1 of a passenger room and above a driver's seat (not shown) where a driver sits. The combiner unit 11 is arranged on the ceiling 1 and in the vicinity of the upper end of a front glass 5.

The projector unit 9 has a display device (not shown) which may be a self-light-emitting (e.g. FE (field emission) display, a fluorescence display tube, EL (electroluminescence) display, a display device equipped with backlight, etc. The display device displays the image of additional information necessary for driving such as information of a traveling direction, a traveling speed in a navigation system. The project or unit 9 is adapted so that the image light of a displayed image emitted from the above display device is caused to outgo toward a front glass 5.

The combiner unit 11 includes a combiner 13 of half-reflecting optical member such as a regular reflection hologram, a semitransparent mirror, etc. and a supporting device 15 for supporting the combiner 13 suspended from the ceiling 1 according to an embodiment of this invention.

Figure 2:
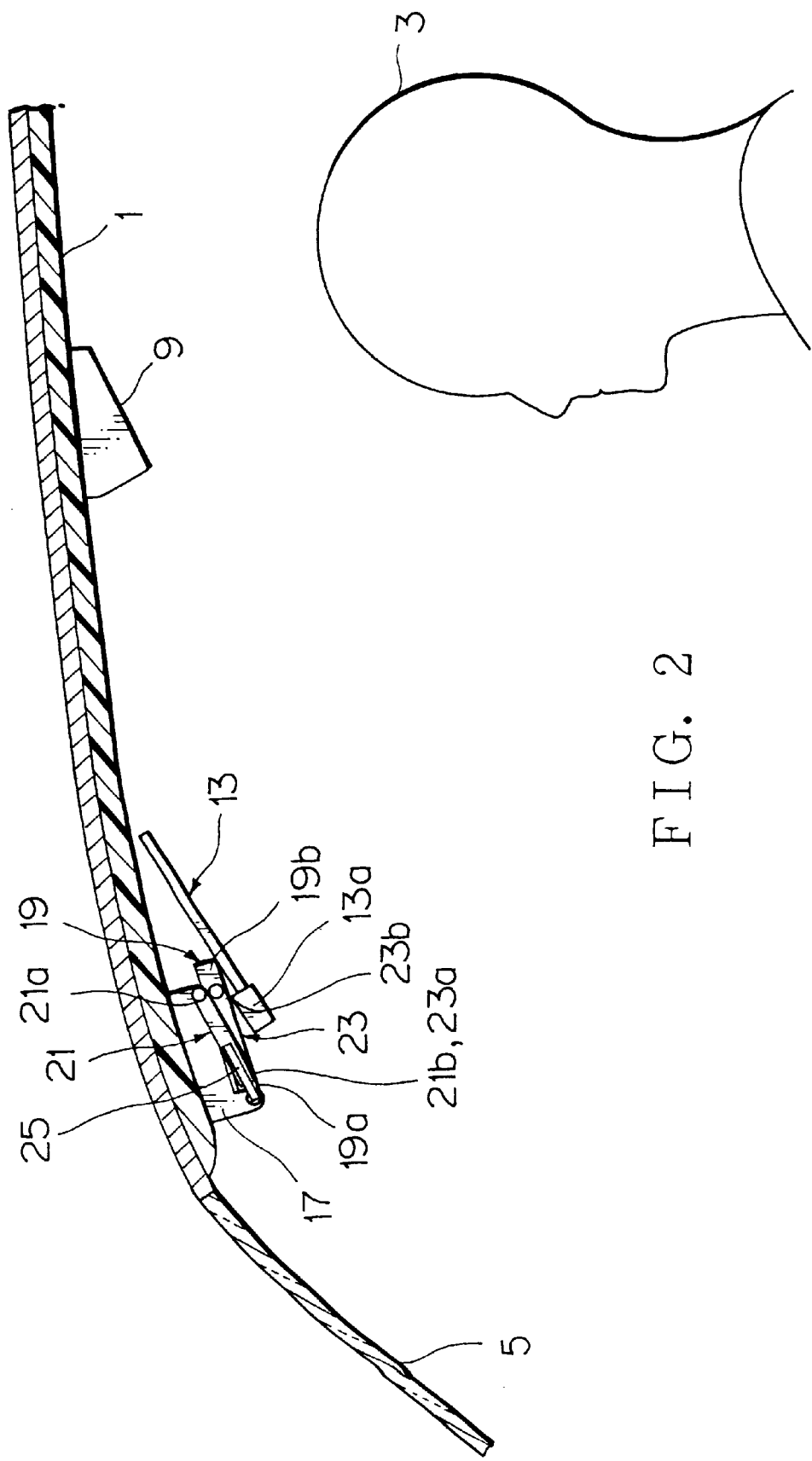
FIG. 2 is a side view an embodiment of a vehicle display system to which a device for supporting a combiner is applied in a state where the combiner has been folded.

The supporting device 15 serves to shift the combiner 14 between the developed state shown in FIG. 1 and the folded state shown in FIG. 2.

In this embodiment, the developed state of the combiner 13 refers to the state where the combiner 13 has been situated in front of the eye point I at a sloping angle of reflecting the image light of the displayed image emitted from the display device of the projector unit 9 toward the eye point of the driver 3.

In this embodiment, the folded state of the combiner 13 refers to the state where the combiner 13 has been moved from the front of the eye point I to the side of the ceiling 1.

In the developed state of the combiner 13, the image light is projected from the display device of the projector unit 9 on the combiner 13, and half-reflected from the combiner 13 toward the eye point I of the driver 3. Because of the image light, the virtual image of the displayed image is visually recognized over the combiner 13 from the eye point I.

In the developed state of the combiner 13, the above virtual image is visually recognized superposedly on the foreground of the vehicle directly visually recognized over the combiner 13 and front glass 5 from the eye point I.

In this embodiment, in the developed state, the combiner 13 has a frame 13a located at its upper end, and the frame 13a is provided with ear-shaped attaching pieces (not shown) on both left and right sides which are projected toward the driver 3.

In FIG. 1, symbol G denotes a center of gravity. In the developed state of the combiner, this center of gravity G is situated at a slightly lower position than that of the attaching pieces on both left and right ends.

The supporting device 15 according to this embodiment is arranged in the vicinity of the front glass 5 of the ceiling 1. The supporting device 15 includes a base member 17 directly attached to the ceiling 1 and first to third arms 19, 21 and 23 which couple the base portion 17 with the frame 13a of the combiner 13. As seen from FIG. 3 which is a front view of the supporting device viewed from the driver, these first to third arms 19, 21 and 23 constitute a pair on both sides, respectively.

The one end 19a of each of the first arms 19 is pivoted on each of left and right sides of the front end of the base member 17. The other end 19b of each of the first arms 19 is attached to each attaching piece (not shown) of the frame 13a. The first arm 19 is adapted to be swingable around the pivoting point for the base portion 17 at the one end 19a.

As seen from FIG. 1, the one end 21a of each of the second arms 21 pivoted on each of left and right sides of the rear end of the base member 17. The rear end of the base portion 17 is spaced from the front end thereof by an interval between a pivoting point where the one end of the first arm 19 is pivoted on the front end of the base member 17 and a point where the attaching piece of the combiner 13 is fixed to the other end of the first arm 19.

Further, the one end 23a of each of the third arms 23 is pivoted on the other end 21b of the second arm 21. The other end 23b thereof is pivoted on a point where the attaching piece of the combiner 13 is pivoted on the other end 19b of each of the first arms 19.

These second arm 21 and third arm 23 are adapted so that the distance between the pivoting point where the one end 21a of the second arm 21 is pivoted on the rear end of the base member 17 and the pivoting point where the other end 21b of the second arm 21 is pivoted on the one end 23a of the third arm 23 is equal to that between the pivoting point where the one end 23a of the third arm 23 is pivoted on the other end of the second arm 21 and the pivoting point where the other end 23b of the third arm 23 is pivoted on the other end 19b of the first arm 19.

In FIGS. 1 and 2, reference numeral 25 denotes each of stopper pieces (which serves as a stopper means). The stopper piece 25 is shaped in a flat parallelogram as shown in FIG. 3. The stopper piece 25 is pivoted on the other end 21b of the second arm 21 so that it is swingable like a seesaw around the center. Specifically, when the one face 25a of two adjacent circumferential faces of the stopper piece 25 leaves the other end 21b of the second arm 21, the other face 25b of the stopper piece 25 approaches the other end 21b of the second arm 21. Inversely, when the one circumferential face 25a of the stopper 25 approaches the other end 21b of the second arm 21, the other circumferential face 25b of the stopper piece 25 leaves the other end 21b of the second arm 21.

As seen from FIG. 3, the stopper piece 25 is provided with a locking pin 25c which protrudes from the other circumferential face 25b.

By causing the one circumferential face 25a to leave the other end 21b of the second arm 21, the tip of the locking pin 25c is fixed into a locking hole 23c at the one end 23a of the third arm 23. Inversely, by applying predetermined external force to the stopper piece 25 to cause the one circumferential face 25a to approach the other end 21b of the second arm 21, the tip of the locking pin 25c is removed from the locking hole 23c of the third arm 23.

An explanation will be given of the operation of a supporting device 15 according to this embodiment configured as described above.

First, from the folded state of the combiner 13, when the first arm 19 is swung around the pivoting point at the front end of the base member 17 so that the other end 19b of the first arm 19 leaves the base member 17 or ceiling 1, the second arm 21 and the third arm 23 in the folded state are developed at an developing angle larger than the swinging angle of the first arm 19 so that the other end 23b of the third arm 23 leaves the one end 21a of the second arm 21.

The second arm 21 and the third arm 23 are developed until they are aligned in a line. Thus, when the other end 23b of the third arm 23 cannot further leave the one end 21a of the second arm 21, the first arm 19 with the other end 19b on which the other end 23b of the third arm 23 is pivoted extends in a height direction of the vehicle (i.e. vertically).

Then, the combiner 13 with the frame 13a fixed to the other end 19b of the first arm 19 through the attaching pieces falls into a developed state where it is located in front of the eye point I at a sloping angle of reflecting the image light of the displayed image from the display device of the projector unit 9 toward the eye point I of the driver 3. Thus, the center of gravity G of the combiner 13 is located below the other end 19b of the first arm 19 in a direction of the vehicle height.

Incidentally, while the first arm 19 is swung in order to develop the combiner 13, the one circumferential face 25a of each stopper piece 25 remains approached the other end 21b of the second arm 21. When the first arm 19 has been swung until the combiner 13 is developed, the one circumferential face 25a is caused to leave the other end 21b of the second arm 21 so that the locking pine 25c of the stopper piece 25 is fixed into the locking hole 23c at the one end 23a of the third arm 23.

The operation of developing the second arm 21 and the third arm 23 which is tied to the swing of the first arm 19 is stopped by the stopper pieces 25. The jouncing of the second arm 21 and third arm 23 toward the direction of developing or folding is limited by the stopper pieces 25.

Since the developing angle of the second arm 21 and the third arm 23 is larger than the swinging angle of the first arm 19, the jouncing of the first arm 19 in the swinging direction is limited with a higher accuracy than the jouncing of the second arm 21 and third arm 23 in the developing or folding direction.

Meanwhile, in the developed state of the combiner 13, since the first arm 19 is extended along a vertical line passing the center of gravity G of the combiner 13, the weighting component due to the weight of the combiner 13 itself is wholly applied to the first arm 19. The vertical component of the counterforce (vector-resolved into the vertical component and the horizontal component (vehicle-lengthwise component)) from the combiner 13, which is opposite to external force such as vibration applied to the combiner 13 through the base member 17 and the first arm 19 from the ceiling 1, is also wholly applied to the first arm 19.

Since the vertical movement of the first arm 19 is limited by the base member 17 and ceiling 1 to which the base member 17 is attached, the vertical shaking of the combiner 13 attached to the other end 19b of the first arm 19 is limited by the first arm 19, base member 17 and the ceiling 1.

In the developed state of the combiner 13, the horizontal component of the counterforce is not applied to the first arm 19, but is wholly applied to the second arm 21 and the third arm 23 aligned in a line, which are laid out in a direction including the horizontal component.

However, the horizontal movement of the second arm 21 is stopped by the base member 17, on which the one end 21a of the second arm is pivoted, and the ceiling 1, and the horizontal movement of the third arm 23 is stopped by the second arm 21, on the other end 21b of which the one end 23a of the third arm is pivoted. The horizontal movement of the first arm 19 is stopped by the third arm 23, on the other end 23b of which the other end 19b of the first arm 19 is pivoted. Thus, the horizontal shaking of the combiner 13, which is fixed to the other end of the 19b of the first arm 19, is stopped by the second arm 21, third arm 23, base member 17 and ceiling 1.

Next, when the first arm 19 is to be swung around the pivoting point at the front end of the base member 17 so that the other end 19b of the first arm 19 approaches the base member 17 or the ceiling 1 from the developed state of the combiner 13, the locking pin 25c of each stopper piece 25 is previously released from the locking hole 23 of the third arm 23.

Simultaneously when the first arm 19 is swung from this state, the second arm 21 and the third arm 23 in the developed state are folded at a folding angle larger than the swinging angle of the first arm 19 so that the other end 23b of the third arm 23 approaches the one end 21a of the second arm 21 pivoted on the rear end of the base member 17.

When the second arm 21 and the third arm 23 are folded so that they substantially overlap and hence the other end 23b of the third arm 23 cannot further approach the one end 21a of the second arm 21, the first arm 19 the other end 19b of which is pivoted on the other end 23b of the third arm 23 extends along the ceiling 1.

The combiner 13 the frame 13a of which is fixed to the other ends 19b of the first arm 19 through the attaching pieces falls in the folded sate where it is retracted from the front of the eye point I toward the ceiling 1.

The combiner 13 in the folded state can be fixed by one or plurality of the static friction force of the one end 19a of the first arm 19 against the front end of the base member 17, that of the one end 21a of the second arm 21 against the second arm 21, that of the one end 23a of the third arm 23 against the other end 21b of the second arm 21 and that of the other end 23b of the third arm 23 against the other end 19b of the first arm 19.

Otherwise, the combiner 13 in the folded state can also be fixed by a separate member arranged among the above members to keep the combiner 13 in the folded state which is removable like the stopper pieces 25.

As described above, in accordance with this embodiment, in the combiner unit 11 which is arranged in the vicinity of the front glass 5 of the ceiling 1 of a vehicle room is composed of a combiner 13 of half-reflecting optical member such as a regular reflection hologram, a semitransparent mirror, etc. and a supporting device 15 for supporting the combiner 13 suspended from the ceiling 1, the supporting device 15 includes a first arm 19 the one end 19a of which is pivoted on the front end of the base member 17 attached to the ceiling 1 and the other end of which the attaching pieces of the combiner 13 are attached to and which can be swung around the pivoting point where the one end 19a is pivoted on the front end of the base member 17, a second arm 21 the one end 21a of which is pivoted on the rear end of the base member 17, and a third arm 23 the one end 23a of which is pivoted on the other end 21b of the second arm 21 and the other end of which is pivoted on the other end 19b of the first arm 19.

In the developed state of the combiner 13, the first arm 19 extends along a vertical line passing the center of gravity G of the combiner 13, and the second arm 21 and the third arm 23 are aligned on and extended along a line which couples the rear end of the base member 17 and the other end 19b of the first arm 19 and tilts from the vertical direction toward the horizontal direction so that the combiner 13 is arranged in front of the eye point I at a tilting angle of reflecting the image light of the displayed image emitted from the display device of the projector unit 9 toward the eye point I of the driver 3.

In this way, the vertical shaking of the combiner 13 is stopped by the first arm 19, base member 17 and ceiling 1, and the horizontal shaking thereof is stopped by the second arm 21, third arm 23, base member 17 and the ceiling 1. Thus, in the vehicle which is susceptible to the vibration from the road face, using the combiner 13, the displayed image of the additional information necessary for vehicle driving can be visually recognized stably with no shaking.

It is not necessarily required that the second arm 21 and third arm 23 are adapted so that the distance between the pivoting point where the one end 21a of the second arm 21 is pivoted on the rear end of the base member 17 and the pivoting point where the other end 21b of the second arm 21 is pivoted on the one end 23a of the third arm 23 is equal to that between the pivoting point where the one end 23a of the third arm 23 is pivoted on the other end of the second arm 21 and the pivoting point where the other end 23b of the third arm 23 is pivoted on the other end 19b of the first arm 19.

However, where the second arm 21 and third arm 23 are designed with the dimensions defined in this embodiment, in order to cause the second arm 21 and the third arm 23 to overlap substantially completely in the folded state of the combiner 13, the distance to be set between the front end of the base member 17 and the rear end thereof can be uniquely defined with the dimension approximately equal to the distance between both pivoting points at the one end 19a and the other end 19b of the first arm 19. This facilitates to design the supporting device 15 easily.

In the developed state of the combiner 13, a configuration can be omitted in which the tip of each locking pin 25c is fixed into the locking hole 23c so that the jouncing of the second arm 21 and third arm 23 in the in the developing or folding direction is limited by the stopper piece 25.

However, with the aid of the stopper piece 25 locked to the third arm 23, this configuration limits the jouncing in the developing or folding direction of the second arm 21 and third arm 23 which have the developing angle larger than the swinging angle of the first arm 19, and resultantly limits the jouncing of the first arm 19 in the swinging direction with a higher accuracy than the jouncing of the second arm 21 and third arm 23 in the developing or folding direction, thereby stopping the jouncing of the combiner 13 with high accuracy in the horizontal direction of the vehicle.

It is needless to say that the layout of the stopper piece and the locking hole may be reversed for the second arm 21 and the third arm 23 in such a fashion that the stopper piece is pivoted to be swingable like a seesaw on the one end 23a of the third arm 23 in place of the other end 21b of the second arm 21 and the locking hole to be engaged with the tip is formed at the other end of the second arm 21.

Incidentally, the contents of Japanese Patent Appln. No. 2001-099568 filed Mar. 30, 2001 are hereby incorporated by reference.

What is claimed is:

1. A supporting device for supporting a combiner for a vehicle display system which is suspended from a ceiling of the vehicle room to be located in front of an eye point in the vehicle room and on which image light of a displayed image for driving information is projected so that a virtual image of the displayed image is visually recognized from the eye point, comprising:
    a first arm with one end pivoted on the ceiling and the other end attached to said combiner, said first arm being swingable around a pivoting point at said one end;
    a second arm with one end pivoted on the ceiling which is apart from the one end of said first arm in a horizontal direction of the vehicle; and
    a third arm with one end pivoted on the other end of said second arm and the other end pivoted on the other end of said first arm, wherein
        in a developed state of the combiner where the first arm extends along a vertical line passing the center of gravity of the combiner 13 and said combiner is arranged in front of said eye point, the second arm and the third arm are aligned on and extended along a line which couples a pivoting point at the one end of said second arm on the ceiling and an attaching point at the other end of said first arm to the combiner; and
        in a folded state of the combiner where said first arm extends substantially along said ceiling and said combiner is retracted from the front of said eye point toward the ceiling, said second arm is folded relatively to said third arm from a pivoting point of the other end of said second arm on the one end of said third arm so that said second arm and said third arm are extended substantially along the ceiling.

2. A supporting device for supporting a combiner for a vehicle display system according to claim 1, wherein the second arm and third arm are adapted so that the distance between the pivoting point where the one end of the second arm is pivoted on the ceiling and the pivoting point where the other end of the second arm is pivoted on the one end of the third arm 23 is equal to that between the pivoting point where the one end of the third arm is pivoted on the other end of the second arm and the pivoting point where the other end of the third arm is pivoted on the other end of the first arm.

3. A supporting device for supporting a combiner for a vehicle display system according to claim 2, further comprising a stopper means for stopping a folding movement of the other end of the second arm relative to the one end of the third arm, which is locked to at least one of said second arm and said third arm in the developed state of the combiner, said stopper means being releasable from a locked state by application of prescribed external force.

4. A supporting device for supporting a combiner for a vehicle display system according to claim 1, further comprising a stopper means for stopping a folding movement of the other end of the second arm relative to the one end of the third arm, which is locked to at least one of said second arm and said third arm in the developed state of the combiner, said stopper means being releasable from a locked state by application of prescribed external force.

* * * * *